US008488764B1

(12) United States Patent
Swartz (10) Patent No.: US 8,488,764 B1
(45) Date of Patent: Jul. 16, 2013

(54) CONFERENCE CALL SELECTABLE CONFIGURATION IN WHICH PARTICIPANTS CAN BE CONFIGURED TO JOIN AT DIFFERENT TIME (ORDER), USE PRESENCE INFORMATION TO CONFIGURE/INITIATE THE CONFERENCE CALL

(75) Inventor: Douglas W. Swartz, Lakewood, CO (US)

(73) Assignee: Avaya Inc., Basking Ridge, NJ (US)

(*) Notice: Subject to any disclaimer, the term of this patent is extended or adjusted under 35 U.S.C. 154(b) by 1349 days.

(21) Appl. No.: 11/860,700

(22) Filed: Sep. 25, 2007

Related U.S. Application Data

(60) Provisional application No. 60/951,611, filed on Jul. 24, 2007.

(51) Int. Cl.
*H04M 3/42* (2006.01)

(52) U.S. Cl.
USPC .................. 379/204.01; 370/261; 455/416

(58) Field of Classification Search
USPC ............. 379/201.01, 202.01, 204.01, 205.01, 379/210.01; 370/260, 261, 262; 455/416
See application file for complete search history.

(56) References Cited

U.S. PATENT DOCUMENTS

| | | | |
|---|---|---|---|
| 6,317,593 B1 | 11/2001 | Vossler | |
| 7,089,280 B1 | 8/2006 | Satapathy et al. | |
| 7,130,885 B2 | 10/2006 | Chandra et al. | |
| 7,616,751 B2 | 11/2009 | Mohler | |
| 7,653,193 B2 * | 1/2010 | Pfleging et al. | 379/205.01 |
| 7,751,542 B2 | 7/2010 | Klemm et al. | |
| 7,970,666 B1 | 6/2011 | Handel | |
| 2003/0055899 A1 | 3/2003 | Burger et al. | |
| 2003/0195930 A1 | 10/2003 | Henrikson et al. | |
| 2003/0206619 A1 * | 11/2003 | Curbow et al. | 379/210.01 |
| 2004/0028200 A1 * | 2/2004 | Carlson | 379/201.01 |
| 2004/0071150 A1 | 4/2004 | Honkala et al. | |
| 2005/0135279 A1 * | 6/2005 | Zabawskyj | 370/260 |
| 2005/0171830 A1 | 8/2005 | Miller et al. | |
| 2005/0276406 A1 * | 12/2005 | Keohane et al. | 379/202.01 |
| 2006/0047557 A1 | 3/2006 | Bieselin et al. | |
| 2006/0067250 A1 | 3/2006 | Boyer et al. | |
| 2006/0148499 A1 | 7/2006 | Chie | |
| 2006/0165066 A1 | 7/2006 | Campbell et al. | |
| 2006/0177034 A1 | 8/2006 | Reding et al. | |
| 2007/0036317 A1 * | 2/2007 | Shaffer et al. | 379/202.01 |
| 2007/0081644 A1 | 4/2007 | Jachner | |
| 2007/0172045 A1 | 7/2007 | Nguyen et al. | |
| 2008/0084984 A1 | 4/2008 | Levy et al. | |
| 2008/0258908 A1 | 10/2008 | Graef | |

FOREIGN PATENT DOCUMENTS

| | | |
|---|---|---|
| WO | WO 97/32256 | 9/1997 |
| WO | WO 01/65336 | 9/2001 |
| WO | WO 01/72022 | 9/2001 |
| WO | WO 2004/049677 | 6/2004 |
| WO | WO 2005/034483 | 4/2005 |

OTHER PUBLICATIONS

U.S. Appl. No. 12/016,040, filed Jan. 17, 2008, Chavez et al.

(Continued)

*Primary Examiner* — Antim Shah
(74) *Attorney, Agent, or Firm* — Sheridan Ross P.C.

(57) ABSTRACT

An automated method and system is provided for configuring conference calls in which participants can be joined automatically at different times and in response to differing stimuli and in which presence information is used to configure and/or initiate the conference calls.

16 Claims, 4 Drawing Sheets

OTHER PUBLICATIONS

"Avaya Meeting Exchange for IBM Lotus Sametime and Notes", Product Brief, Avaya, Inc., available at http://www.avaya.com/master-usa/en-us/resource/assets/brochures/groupware%20edition_factsheet_uc2999_final.pdf, 2007, pp. 1-4.

"Avaya Communications Process Manager", Avaya Inc. Release 2.2, Doucument No. 04-601161, Issue 12, Aug. 2008, 70 pages.

"Avaya Meeting Exchange for IBM Lotus Notes and Sametime", Avaya, Inc., available at http://support.avaya.com/elmodocs2/meeting_exchange/IBM_Lotus/17_300735_2.zip, Release 1.0.5, Document No. 17-300735, Issue 2, Feb. 2007.

"Spectel 7000 a modular, multimedia platform for every conferencing need" available at http://web.archive.org/web/20040707191844/http://www.spectel.com/solutions/downloads/Spectel7000v4_6.pdf, site updated Jul. 7, 2004, 2 pages.

"Avaya Adds New IP Capabilities to its MultiPoint Conferencing Unit, Enabling Lower Network Costs", Press Release, Jul. 24, 2000, pp. 1-2.

"Avaya by Example", Copyright 2006, Avaya Inc., printed Mar. 14, 2007, pp. 108.

"eDial Adds Mobile Capabilities to its Voice Conferencing System with Shipment of Version 2.1", Press Release, Jan. 15, 2002, pp. 1-2.

"eDial intros audioconferencing & web-presentation tool", available at http://www.newsaboutav.com/eDialintrosaudioconferencingwebpresentationtool.html, printed Aug. 7, 2006, pp. 1-4.

"IP Telephony Solutions: VoIP IP Telephony Systems Overview from Avaya", available at http://www.avaya.com/gcm/master-usa/en-us/pillars/iptelephony/index.htm, printed Aug. 24, 2006, pp. 1-3.

"IP-Telephony Products", available at http://www.iptel.org/info/products, printed Aug. 7, 2006, pp. 1-9.

"Learn the Facts About Mobility", available at http://www.avaya.com/gcm/master-usa/en-us/tasks/learn/facts/mobility/qa4/ucqa4.htm, printed Jul. 18, 2007, pp. 1-3.

"Learn the Facts About Services", available at http://www.avaya.com/gcm/master-usa/en-us/tasks/learn/facts/factsservices/qa11/manservformtngexchnge.htm, printed Jul. 18, 2007, pp. 1-3.

"Scott Petrack of eDial", VON Pioneers, Oct. 2005, pp. 1-8.

"SIP Telephones", available at http://www.iptel.org/info/products/sipphones.php, printed Aug. 7, 2006, pp. 1-10.

"Turn to NEC!", available at http://ad.doubleclick.net/adi/idg.us.nwf.convergence/;pos=imu;sz=336×280;tile=4;type=news;ord=031829, printed Aug. 7, 2006, p. 1.

"Using SIP Supplementary Services", available at http://www.cisco.com/en/US/products/hw/gatcont/ps514/products_administration_guide_c . . . , Cisco Systems, printed Aug. 7, 2006, pp. 1-6.

Robertson, "SIPphone—Call worldwide over your Internet connection with any phone", available at http://www.sipphone.com/email/thecall06.html, May 17, 2004, pp. 1-3.

\* cited by examiner

CONFERENCE CALL SELECTABLE CONFIGURATION IN WHICH PARTICIPANTS CAN BE CONFIGURED TO JOIN AT DIFFERENT TIME (ORDER), USE PRESENCE INFORMATION TO CONFIGURE/INITIATE THE CONFERENCE CALL

CROSS REFERENCE TO RELATED APPLICATION

The present application claims the benefits of U.S. Provisional Application Ser. No. 60/951,611, filed Jul. 24, 2007, of the same title, which is incorporated herein by this reference in its entirety.

FIELD OF THE INVENTION

The invention relates generally to web conferencing and particularly to audio web conferencing.

BACKGROUND OF THE INVENTION

Audio multi-party conferencing is critical to conducting business today. Circuit-switched audio conferencing can be initiated from a participant's phone but typically is limited to three or fewer participants. Outsourced conferencing services enable multi-party conference calls of larger numbers of participants. Such outsourced conferencing services, however, have become a significant expense for many organizations.

Audio and video web conferencing is rapidly replacing circuit-switched audio conferencing. Using such applications, users, through a graphical user interface, can set up conference calls among a large number of parties. The applications have been integrated with electronic calendars to schedule seamlessly the calls. When a user identifies the conference call participants and specifies conference call time and duration, invitations are sent automatically to each desired participant to docket the call time and contact information on each participant's electronic calendar. The invitation can include conference call options to indicate whether and how the potential participant will participate in the conference call. As each conference call option selection is received, another updated conference call invitation is sent to each participant. At the scheduled time, the conference call is initiated by the originating participant's teleconferencing bridge automatically or by each participant calling into the bridge. When automated, the order of joining the participants is generally based on the order in which the invitations are generated or accepted or by random selection. Such applications have reduced corporate expenses by eliminating outsourced conferencing services and saving per-port charges levied by the telecommunication service providers for each teleconferencing minute.

Although audio and web conferencing is a major improvement over circuit-switched audio conferencing, it still gives the originating participant only limited control over the configuration of the conference call.

SUMMARY OF THE INVENTION

These and other needs are addressed by the various embodiments and configurations of the present inventions. The present inventions are directed to an automated method and system for configuring conference calls in which, inter alia, participants can be joined automatically at different times and in response to differing stimuli and in which presence information is used to configure and/or initiate the conference calls.

In a first invention, a method includes the steps:

(a) receiving, from a subscriber, configuration information for a multiparty conference call, the configuration information including a plurality of: an identity of one or more of the participants for the conference call, contact information for one or more of the conference call participants, a start time for the conference call, an end time for the conference call, and a conference call duration, wherein at least one of the following is true of the configuration information:

(A1) the configuration information sets forth an order in which to join at least first and second participants;

(A2) the configuration information sets forth a plurality of different times for joining different participants; and (A3) the configuration information sets forth at least one event upon which joining a participant is contingent;

(b) creating data structures associated with the configuration information;

(c) at an appropriate time, retrieving the data structures and contacting automatically each of the participants in accordance with the data structures; and (d) connecting each of the participants with one another to initiate the conference call.

This invention can provide the conference call host or initiator with the ability to schedule, as he or she sees fit, the order and timing of joining conference call participants. The initiator can select specific and disparate times at which conference participants are to be joined. For example, a first participant can be joined at 2:15 pm and a second at 2:30 pm. Alternatively, the second participant is joined after the first participant in response to the initiator issuing a command during the conference call. In another variation, the timing of joining someone in a conference call is based on the disconnection of another party from or connection of the party to the conference call. By way of example, a third participant is joined in automatically when a second participant disconnects from or connects to the conference call.

Setting up the conference call can thus be seamless to the initiator. The initiator need not laboriously place participants on hold while another participant is joined.

In yet another invention, an auto-conferencing method is provided that includes the following steps:

(a) receiving a set of participants for a conference call and a start time for the conference call;

(b) scheduling the conference call in an electronic calendar of at least one of the participants;

(c) accessing presence information for a plurality of the participants in advance of the conference call; and (d) using the presence information, automatically contacting the participants to set up the conference call in temporal proximity to the start time.

The use of presence information in scheduling and/or initiating a conference call can provide for fewer unsuccessfully initiated conference calls due to absentee participants and therefore lead to substantial benefits to businesses. Each time a conference call is incompletely populated, the call must either be abandoned or conducted inefficiently and sometimes ineffectively without full attendance.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the inventions to provide an understanding of some aspects of the invention. This summary is neither an extensive nor exhaustive overview of the inventions and their respective embodiments. It is intended neither to identify key or critical elements of the inventions nor to delineate the scopes of the inventions but to present selected concepts of the inventions in a simplified form as an introduction to the more detailed description presented below. As will be appreciated, other embodiments of the inventions are possible utilizing, alone or in combination, one or more of the features set forth above or described in detail below.

DETAILED DESCRIPTION

The various inventions will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to conference multiple parties together, whether by live voice, text, and/or video, such as web conferencing, text chat, and instant messaging.

Figure 1:
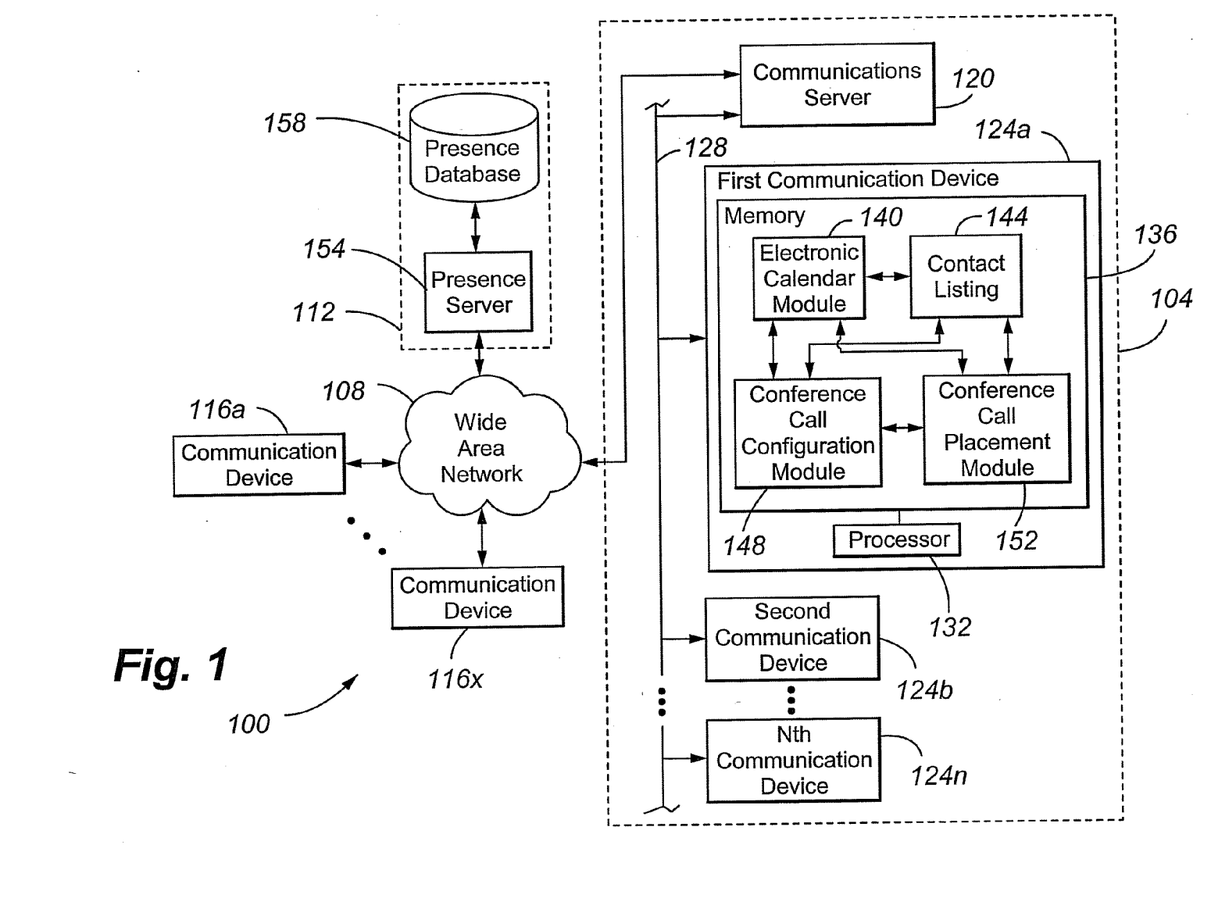
FIG. 1 is a block diagram of a communications architecture according to an embodiment of the present invention.

FIG. 1 depicts an architecture 100 according to a first embodiment of the present invention. Referring to FIG. 1, an enterprise network 104 is in communication, via packet-switched (typically untrusted or unsecure or public) Wide Area Network (WAN) 108, with a presence service 112, and a plurality of external communication devices 116a-x. The enterprise network 104 includes a communications server 120 and a plurality of internal first, second, . . . nth communications devices 124a-n, interconnected by a (trusted or secure or private) Local Area Network (LAN) 128. As will be appreciated, extensions of internal communication devices are extensions within the enterprise network 104 that are directly serviced by the enterprise server. More particularly, these extensions correspond to endpoints serviced by the server, and the server can direct incoming calls to and receive outgoing calls from these extensions in a conventional manner. External terminals are not directly supported as endpoints by the enterprise server.

The communications server 120 can include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc. The server 120 is preferably configured to execute telecommunication applications such as the suite of MultiVantage™ applications of Avaya, Inc., including Communication Manager™ and MultiVantage Express™. The server 120 preferably includes one or more MultiPoint Conferencing Units™ (MCU) and/or Meeting Exchange™ of Avaya, Inc., and a suitable conferencing server, such as a 1056-port CS700 Conferencing Server™ of Avaya, Inc. These products typically require the participants to dial into a conference bridge using a predetermined dial-in number and access code to initiate conferences, without an operator or advanced reservations. As will be appreciated, these products further provide integrated features such as audio and web conference management, desktop sharing, polling, interactive whiteboard session, chat, application sharing, conference recording and playback of audio and web portions of the conference, and annotation tools.

The first, second, . . . nth communication devices 124*a-n* can be any IP-capable hard- or softphone modified to perform the operations of the present invention. Examples of suitable modified IP telephones include the 5600™, 9620™, 9630™, 9640™, 9640G™, 9650™, and Quick Edition™ telephones and IP wireless telephones of Avaya, Inc. The communication devices 124*a-n* each include a processor 132 and memory 136. The memory 136 includes various computational modules, including an electronic calendar module 140, such as Outlook™ by Microsoft, Inc., a listing of contact information 144, a conference call configuration module 148, and a conference call placement module 152.

The electronic calendar 140 handles scheduling of all conference calls requested by a subscriber. Accordingly, the calendar 140 automatically sends conferencing invitations to conference call participants, receives and processes accept and decline responses and sends updated conferencing invitations responsive thereto, and, when all participants agree upon a time for the call, handles entry of the scheduled conference call into each participant's electronic calendar. The conferencing invitations include a number of fields that may vary by the communication modality selected by each participant. Exemplary fields include subject, location, label, start time, end time, reminder time, description, participant identifiers, participant selected communication modality identifier for one or more of the identified participants, participant contact information (e.g., electronic address of endpoint to participate in conference call) for one or more of the identified participants, accept, decline, and scheduling changes. A pointer in each participant's calendar entry references data structures associated with the scheduled conference call.

The contact listing 144 (or local address book) is a subscriber-selected listing of contact information from which the conference call participants may be selected. The contact listing may be automatically configured, or populated initially, in response to tracking the subscriber's interpersonal communications, manually input by the subscriber, or a combination thereof. Each contact listing entry includes, for example, the name of the person, home address, employer, category of the person, and electronic addresses of one or more of the person's communication devices. A participant may be selected by accessing the contact listing and selecting the participant's entry.

Figure 2:
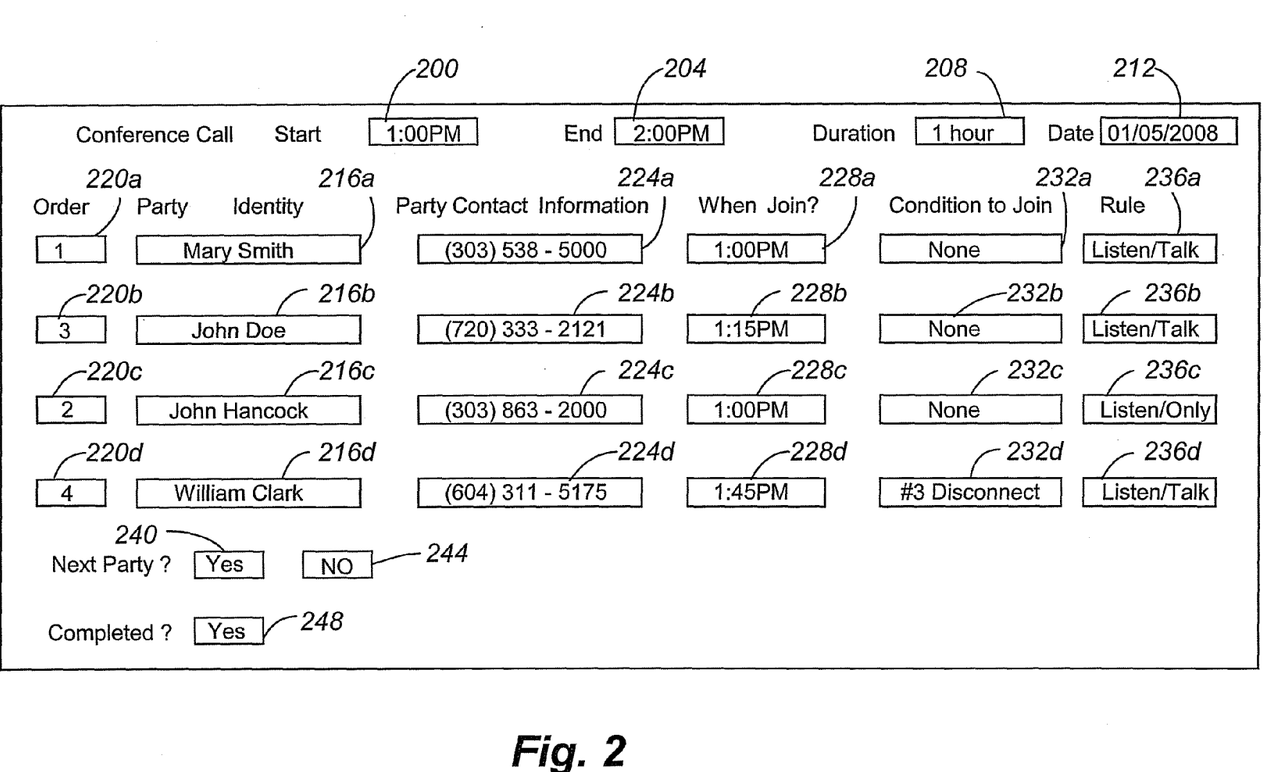
FIG. 2 depicts a graphical user interface display according to an embodiment of the present invention.

The conference call configuration module 148 provides a graphical user interface to the subscriber to enable the subscriber to configure a conference call. As shown in FIG. 2, the display provides a number of options or fields, including a number of conference call start time 200, end time 204, duration 208, date 212, the name 216*a-d* of each participant, and, for each named participant, an order identifier 220*a-d* indicating an order in which the corresponding participant is to be contacted, an electronic address 224*a-d* (e.g., a telephone number, address of record, and the like) of the corresponding participant, a time 228*a-d* to join the corresponding participant, a condition or precursor event 232*a-d* to join the corresponding participant, and role identifier 236*a-d*. Additional participants can be selected using yes/no icons 240 and 244. Completion of the display is indicated by selecting "yes" icon 248.

The conference call placement module 152 contacts automatically each conference call participant at the time and by the communication modality indicated by the subscriber. This can be done, for example, by the server 120 simulating telephone number key presses for a participant to be contacted by circuit-switched phone or by sending Voice over Internet Protocol or IP call set up messages to the appropriate electronic addresses. When the participant answers the call, he or she receives a message such as "This is your conference call scheduled for X pm. Please hold while I connect the other participants." When all of the participants have answered, the conference bridge is activated so that they are all conferenced together.

In the example depicted in FIG. 2, the conference call initiator or host is Mary Smith, the participant on the first line of the display. The configuration module 148 auto-populates this entry as the module already knows her information. Unless indicated otherwise, the initiator is assumed to be the first participant to be contacted when the conference call is initiated.

Returning to the example, Mary Smith has selected John Doe, John Hancock, and William Clark as participants. She has further indicated, using order identifier 220, the order in which the participants are to be contacted and joined to the conference call. Mary Smith is to be first contacted at 1:00 pm by the conference call placement module 152; John Hancock second as close to 1 pm as possible; John Doe third at 1:15 pm; and William Clark immediately after John Hancock disconnects from the conference call but not later than 1:45 pm. Alternatively, Mary Smith could have stipulated that William Clark be connected immediately after John Hancock connects to the conference call. Regarding the handling of each participant's media stream, Mary Smith, John Doe, William Clark, and John Hancock are to receive outgoing media streams from each of the other participants (as each of these three participants listens and talks). The outgoing media stream of John Hancock, however, is not forwarded to the other three participants (as he is listen only). As will be appreciated, the media stream may be audio only or a combination of audio and video.

In one configuration, the conference call initiator can further indicate what communication modality is to be used for each participant. For example, Mary Smith could ask for herself to be connected by circuit-switched phone, John Doe and William Clark by packet-switched phone, and John Hancock by instant messaging, with the speech being converted into a streaming text equivalent.

In one configuration, the subscriber may indicate that a participant is to be conferenced into the conference call only if he decides, during the call, to do so. In other words, the contingent event that must be satisfied before the participant is joined is a decision made and a command issued by the subscriber during the conference call. The command may be as simple as a single key press or icon selection. The subscriber need not dial the participant's electronic address. In the other cases above, the contingent event is either temporal or based upon an action of a participant other than the subscriber.

The presence service 112 includes a presence server 154 and an associated presence information database 158 that may or may not be operated by the enterprise network. The presence server 154 and presence information database 158 collectively track the presence and/or availability of presence service subscribers and/or their communication devices and provide, to requesting entities, current presence information respecting selected presence service subscribers.

"Presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

Presence information can further include user preferences. User preferences, for example, include contact mode preferences or profiles such as the communication device to be contacted for specific types of contacts or under specified factual scenarios, contact time preferences, impermissible contact types and/or subjects such as subjects about which the person does not wish to be contacted, permissible contact type and/or subjects such as subjects about which the person does wish to be contacted, and contactor's to be given preference, priority, or additional choices for user's communication endpoints and/or mode. For example, user preferences can include a buddy list much like instant messaging. User preferences permits a user to specify modes of communication based upon the time of day of communications, e.g., the user might accept a nonurgent call on a cell phone during the day but after hours direct it to a voice-mail or Interactive Voice Response unit. User preferences permit a user to select which medium of communication he or she wants to use or respond with, based upon a wide number of parameters.

The presence server 154 can act as both a presence agent and proxy. Presence agents receive and respond to SUBSCRIPTION requests, send NOTIFY requests, and generate state notifications as defined by the Session Initiation Protocol ("SIP") Events specification. Before establishing a dialog and sending notifications over that dialog, presence agents first authenticate SUBSCRIPTION requests. Proxies forward SUBSCRIBE requests to another presence agent.

In one configuration, the presence service 112 is used to access participant presence information for the graphical user interface displayed to the subscriber or immediately prior to contacting the participant to connect him or her to the conference call. The subscriber first enters an address of record into the display as participant contact information. The configuration module 148 then retrieves the presence information for the participant from the participant's presence service 112. Alternatively, the subscriber can enter a participant's electronic address, which can be mapped to the participant's address of record or presence service 112 using known techniques, such as the ENUM protocol.

In one configuration, the presence service 112 is used when the participant fails to answer at the electronic address selected by the subscriber when the conference call was configured. In that event, the placement module 152 retrieves the absentee participant's current presence information from the presence service 112. The address having the greatest likelihood of contacting successfully the absentee participant is then used to retry joining the participant to the conference call. The number of attempts made using different addresses of absentee participants is user configurable. In this configuration, either intelligent or parallel forking may be employed. When a SIP proxy (a server that processes and forwards SIP requests between calling and called parties) receives an INVITE (request to communicate), it uses the called party's presence information to make a routing decision, or forking. An intelligent fork sends an INVITE to a specific endpoint device of a contactee, while a parallel fork sends simultaneously an INVITE to different endpoint addresses of the contactee.

Alternatively at the time of joining each participant, the module 152 can access the presence service of each participant to obtain his or her current presence information and use the presence information to contact the participant even if the presence. information is in conflict with the data structures associated with the conference call.

The external communication devices 117*a-x* can be any suitable circuit- or packet-switched or TDM-enabled communication device. Examples include wired and wireless telephones, Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts.

Figure 3:
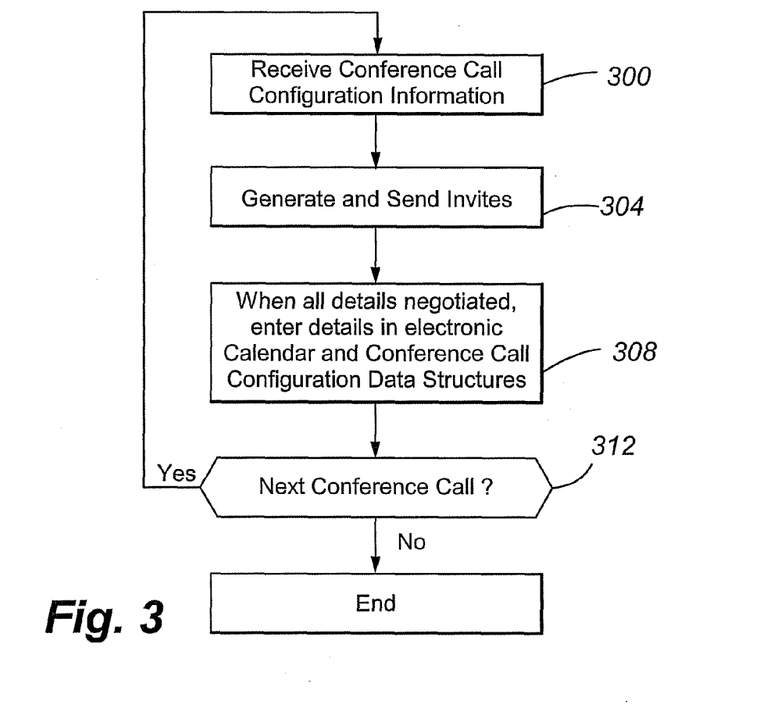
FIG. 3 is a flowchart according to an embodiment of the present invention.

The operation of the conference call configuration module 148 will now be discussed with reference to FIG. 3.

In step 300, a subscriber completes a display similar to FIG. 2 containing conference call configuration information and selects icon 248.

In step 304, the configuration module 148 provides the information to the electronic calendar module 140 and the module 140 generates and sends conferencing invites to the named participants (including the subscriber).

In step 308, when all conference call details have been successfully negotiated amongst the participants, the configuration module 148 creates automatically data structures containing the resulting conference call details and the calendar module 140 causes the entry of the details in each participant's electronic calendar.

In decision diamond 312, the configuration module 148 determines whether there is another conference call to be scheduled. If so, the module 148 returns to step 300. If not, the module 148 terminates operation.

Figure 4:
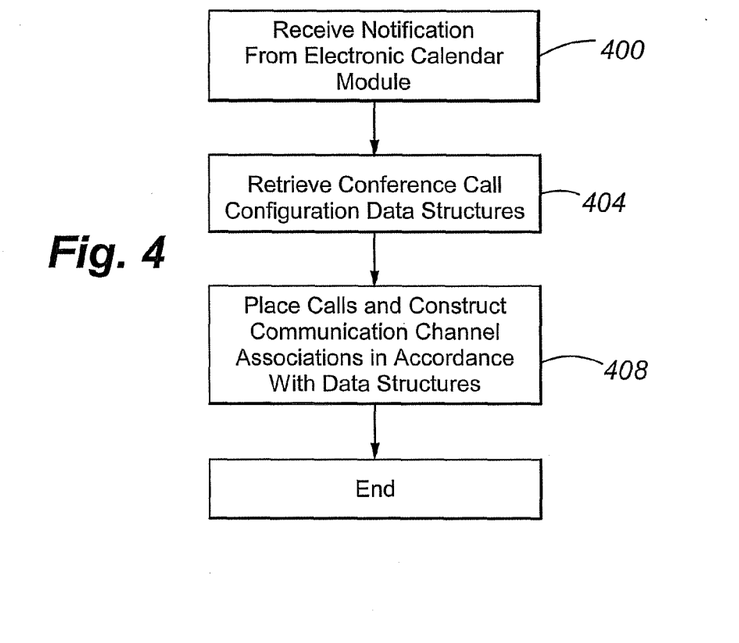
FIG. 4 is a flowchart according to an embodiment of the present invention.

The operation of the conference call placement module 152 will now be discussed with reference to FIG. 4.

In step 400, the module 152 receives notification from the calendar module 140 that a conference call requires initiation. The notification includes a pointer to the data structures describing the conference call. The notification is typically generated in advance of the earliest scheduled initiation time for the call.

In step 404, the module 152 retrieves the conference call data structures.

In step 408, the module 152 places calls and constructs communication channel (i.e., media stream flow) associations in accordance with the data structures.

Figure 5:
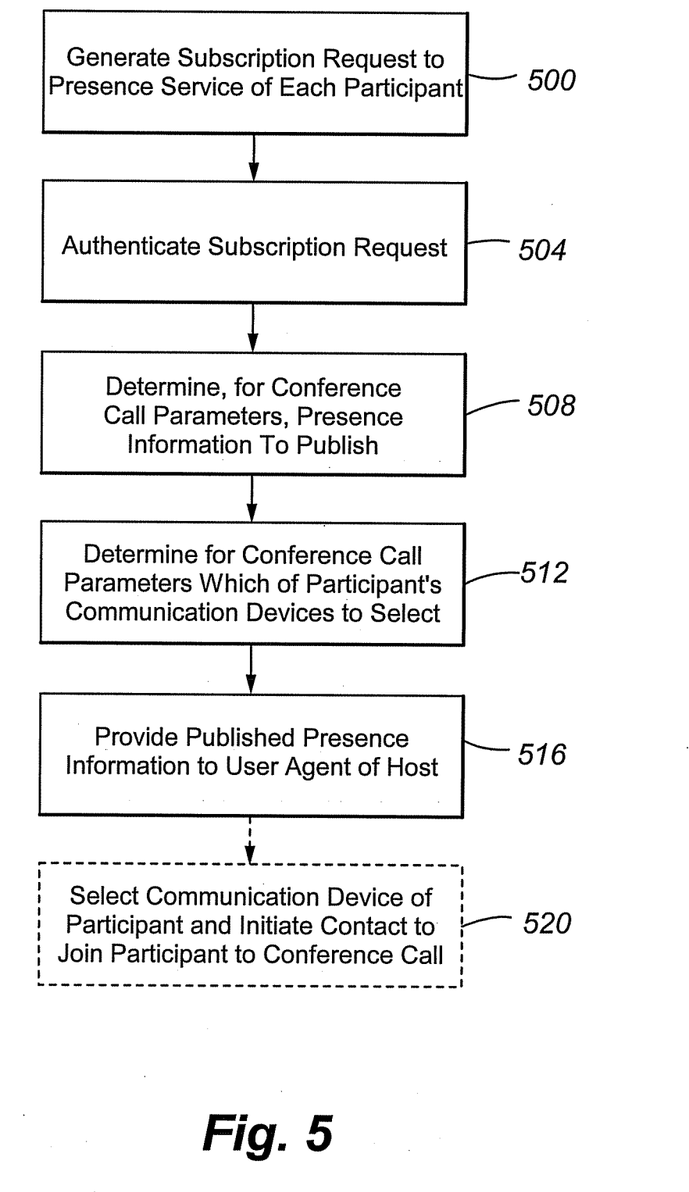
FIG. 5 is a flowchart according to an embodiment of the present invention.

FIG. 5 shows an embodiment according to another invention. This flowchart may be employed to obtain participant's presence information when configuring the conference call or immediately before the conference call.

In step 500, the module 152 generates a SUBSCRIPTION request to the presence service 112 of each participant identified on the graphical user interface display of FIG. 2. The request may be generated for a participant as that participant is added or immediately before that participant is to be contacted and connected to the conference bridge. The SUBSCRIPTION request can include, in addition to the participant's address of record, the conference call parameters, namely conference call start time, end time, duration, date, and required conference call endpoint capabilities. As noted, conference calls can provide features, such as audio and web conference management, desktop sharing, polling, interactive whiteboard session, chat, application sharing, conference recording and playback of audio and web portions of the conference, and annotation tools. These various features can require specific endpoint capabilities for effective implementation in a conference call. By way of example, a video conference call requires each endpoint to have the ability to generate a video stream of the local participant and receive and process video streams of the other participants. Desktop sharing requires each endpoint to be capable of receiving and processing the packets of the application, such as Excel™, being shared during the conference call. If the conference call is to be in the form of a text chat or instant messaging session, the various endpoints must be text chat or instant messaging capable.

In step 504, the presence server 154 authenticates the SUBSCRIPTION request.

In step 508, the presence server 154 determines, for the conference call parameters, which presence information to publish. As noted, presence information can include user preferences. This step permits the user preferences of the participant to be applied to the conference call request. For example, when the user preferences specify which communication device can be published for a specified requestor and/or at the scheduled time of the conference call, only those communication devices are published in response to the SUBSCRIPTION request.

In step 512, the presence server 154 determines for the conference call parameters which of the participant's communication devices to select. This step requires viewing the capabilities of the participant's various communication devices in light of the minimum required capabilities required for the conference call. Only those communication devices meeting or exceeding the minimum required capabilities are selected for publication.

In step 516, the presence server 154 provides the presence information to be published to the user agent of the host. The user agent provides the presence information to the conference call configuration module 148 for presentation to the host in the "party contact information" field of the display of FIG. 2. This may be done as a drop down list of the various communication devices for selection by the host.

Step 520 is applied when steps 500-516 are performed immediately prior to a conference call being initiated. In step 520, the communication device of the participant is selected and a contact initiated to join the participant to the conference call.

The present invention may be used with either a client-server architecture or a peer-to-peer architecture, such as those envisioned by the Session Initiation Protocol and SIP Instant Messaging and Presence Leveraging Extensions or SIMPLE. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the invention does not require a specific Internet Protocol Telephony (IPT) protocol and could be implemented, for example, using QSIG, H.323, and combinations thereof.

The exemplary systems and methods of this invention have been described in relation to conference call scheduling and initiating. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server and/or server adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the various computational modules in memory 136 may be located in other network nodes. For example, one or more of the modules can be located in the server 120. In another example, one or more of the modules can be located on a conferencing service provider's premises with subscribers thereto being charged for using the modules.

In another alternative embodiment, the invention can be used with time-sensitive or dependent items other than conference calls. By way of example, the invention can be used with layered passwords that only become valid in a specific order or at a specific time. This can be done using a display similar to that of FIG. 2, where the party identity and party contact information are replaced by password fields, and the "when join?" and "condition to join" fields are replaced with fields regarding when a password is to become valid and for how long and events upon which password validity is contingent (or what event is required for a password to become valid). Thus, the graphical user interface can become a convenient way to create layered password structures in user security applications.

In yet another embodiment, the participants call into a bridge. Text messages, such as email or instant messages, are forwarded automatically by the conference call placement module 152 to the participants when they are to be joined requesting them to call into the predetermined number associated with the bridge. In this embodiment, the module 152 does not itself automatically make a call to each of the participants.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, from a subscriber, configuration information for a multiparty conference call, the configuration information including a plurality of: an identity of one or more of the participants for the conference call, contact information for one or more of the conference call participants, a start time for the conference call, an end time for the conference call, and a conference call duration, wherein the configuration information sets forth an order in which to join at least first, second and third participants upon initiation of the conference call, independent of a time to join the at least first, second and third participants, wherein the configuration information sets forth at least one event, wherein the at least one event joins the third participant to the conference call contingent upon a specific one of the first or second participants disconnecting from the conference call, and wherein the configuration information additionally sets forth at least a second even upon which joining the third participant is contingent and wherein the second even joins the third participant at a specified time in the conference call even if the specific one of the first or second participants has not disconnected from the conference call by the specified time;

(b) creating data structures associated with the configuration information;

(c) at an appropriate time, retrieving the data structures and contacting automatically each of the participants in accordance with the data structures; and (d) connecting each of the participants with one another to initiate the conference call.

2. The method of claim 1, further comprising:

(e) generating automatically conferencing invitations to the participants identified in the configuration information, the conferencing invitations comprising at least some of the configuration information.

3. The method of claim 1, wherein the order is different from an order in which the participants respond to conferencing invitations associated with scheduling the conference call and an alphabetical ordering of the participants based on the participants' first, middle, and/or last names.

4. The method of claim 1, wherein the configuration information additionally sets forth a plurality of different times for joining different participants.

5. The method of claim 4, wherein a first set of participants has a common first time to be joined and at least one other participant has a different second time to be joined.

6. The method of claim 1, wherein step (d) comprises the substeps:

(D1) contacting automatically a first participant at a first electronic address selected by the subscriber;

(D2) determining automatically that the first participant has not answered at the first electronic address;

(D3) accessing automatically presence information of the first participant;

(D4) selecting automatically a second electronic address based on the presence information; and (D5) contacting automatically the first participant at the second electronic address.

7. A computer readable medium comprising processor-executable instructions to perform the steps of claim 1, wherein the computer readable medium is a tangible medium.

8. A conferencing system, comprising:

(a) a conference call configuration module operable to receive, from a subscriber, configuration information for a multiparty conference call, the configuration information including a plurality of: an identity of one or more of the participants for the conference call, contact information for one or more of the conference call participants, a start time for the conference call, an end time for the conference call, and a conference call duration, wherein the configuration information sets forth an order in which to join at least first and second participants upon initiation of the conference call, independent of a time to join either of the first and second participants, wherein the configuration information sets forth at least one event and wherein the at least one event joins a specific participant contingent upon another specific participant disconnecting from the conference call, and wherein the configuration information additionally sets forth at least a second even upon which joining a participant is contingent and wherein the second even joins a third participant at a specified time in the conference even if the specific one of the first or second participants has not disconnected from the conference call by the specified time;

(b) a set of data structures associated with the configuration information; and (c) a conference call placement module operable, at an appropriate time, to retrieve the data structures, contact automatically each of the participants in accordance with the data structures, and connect each of the participants with one another to initiate the conference call.

9. The system of claim 8, further comprising:

(d) an electronic calendar module operable to generate automatically conferencing invitations to the participants identified in the configuration information, the conferencing invitations comprising at least some of the conferencing information.

10. The system of claim 8, wherein the order is different from an order in which the participants respond to conferencing invitations associated with scheduling the conference call and an alphabetical ordering of the participants based on the participants' first, middle, and/or last names.

11. The system of claim 8, wherein the configuration information sets forth a plurality of different times for joining different participants.

12. The system of claim 11, wherein a first set of participants has a common first time to be joined and at least one other participant has a different second time to be joined.

13. An automated conferencing method, comprising:

(a) receiving a set of participants for a conference call, the set including at least first, second, and third participants, receiving an order in which the set of participants are to be joined to the conference call upon initiation of the conference call, receiving configuration information comprising a precondition for joining the third participant to the conference call, wherein the precondition is an event that joins the third participant to the conference call contingent upon a specific one of the first or second participants disconnecting from the conference call, and receiving a start time for the conference call, wherein the configuration information sets forth at least a second even upon which joining a participant is contingent and wherein the second even joins the third participant at a specified time in the conference even if the specific one of the first or second participants has not disconnected from the conference call by the specified time;

(b) scheduling the conference call in an electronic calendar of at least one of the participants; and (c) accessing presence information for a plurality of the participants in advance of the conference call, wherein at least one of the following is true:

(C1) using the presence information in scheduling the conference call; and (C2) in temporal proximity to the conference call start time, using the presence information to contact the participants to set up the conference call;

(d) joining at least first and second participants included in the set of participants;

(e) after joining the first and second participants, the second participant disconnecting from the conference call; and (f) after the second participant disconnects from the conference call, joining a third participant, wherein disconnecting the second participant is the precondition for joining the third participant.

14. The method of claim 13, wherein (C1) is true.

15. The method of claim 13, wherein (C2) is true.

16. A computer readable medium comprising processor executable instructions to perform the steps of claim 13, wherein the computer readable medium is a tangible medium.

* * * * *

UNITED STATES PATENT AND TRADEMARK OFFICE
CERTIFICATE OF CORRECTION

PATENT NO. : 8,488,764 B1  
APPLICATION NO. : 11/860700  
DATED : July 16, 2013  
INVENTOR(S) : Douglas W. Swartz Page 1 of 1

It is certified that error appears in the above-identified patent and that said Letters Patent is hereby corrected as shown below:

In the Claims:

Column 13, Line 11, please delete "second even upon" and insert --second event upon-- therein.

Column 13, Line 12, please delete "second even" and insert --second event-- therein.

Column 14, Line 6, please delete "second even upon" and insert --second event upon-- therein.

Column 14, Line 7, please delete "second even joins" and insert --second event joins-- therein.

Column 14, Line 49, please delete "even upon" and insert --event upon-- therein.

Column 14, Line 50, please delete "second even joins" and insert --second event joins-- therein.

Signed and Sealed this  
Eighteenth Day of February, 2014

Michelle K. Lee  
*Deputy Director of the United States Patent and Trademark Office*